(12) United States Patent
Wei et al.

(10) Patent No.: US 10,219,303 B2
(45) Date of Patent: Feb. 26, 2019

(54) NARROWBAND INTERNET OF THINGS SYSTEM AND PREAMBLE TRANSMISSION METHOD THEREOF

(71) Applicant: Institute For Information Industry, Taipei (TW)

(72) Inventors: Chia-Hung Wei, Taipei (TW); Hai-Han Wang, Taipei (TW)

(73) Assignee: Institute For Information Industry, Taipei (TW)

( * ) Notice: Subject to any disclaimer, the term of this patent is extended or adjusted under 35 U.S.C. 154(b) by 70 days.

(21) Appl. No.: 15/624,996

(22) Filed: Jun. 16, 2017

(65) Prior Publication Data

US 2017/0367121 A1    Dec. 21, 2017

Related U.S. Application Data

(60) Provisional application No. 62/351,310, filed on Jun. 17, 2016.

(51) Int. Cl.
*H04W 74/08*    (2009.01)
*H04W 72/04*    (2009.01)
(Continued)

(52) U.S. Cl.
CPC ....... *H04W 74/0833* (2013.01); *H04L 5/0048* (2013.01); *H04L 5/0053* (2013.01);
(Continued)

(58) Field of Classification Search
CPC . H04W 74/0833; H04W 76/28; H04W 52/02; H04W 74/042; H04W 72/0446;
(Continued)

(56) References Cited

U.S. PATENT DOCUMENTS

2013/0077584 A1\* 3/2013 Lee .................. H04W 4/70
370/329
2015/0029921 A1\* 1/2015 Lu .................. H04W 52/0235
370/311

(Continued)

*Primary Examiner* — Joshua Kading
*Assistant Examiner* — Lalita W Pace
(74) *Attorney, Agent, or Firm* — Skaar Ulbrich Macari, P.A.

(57) ABSTRACT

A NB-IoT system and a preamble transmission method thereof are provided. The NB-IoT system includes a base station and a user equipment. The base station broadcasts a random access resource configuration. The random access resource configuration includes an NPRACH access intermitting setting. The NPRACH access intermitting setting allocates an NPRACH pause period and an NPDCCH. The user equipment receives the random access resource configuration, and transmits a preamble repeatedly in an NPRACH during a NPRACH transmission period according to the random access resource configuration. The base station detects the preamble in the NPRACH during the NPRACH transmission period, and transmits a random access feedback message in the NPDCCH during the NPRACH pause period. The user equipment receives the random access feedback message in the NPDCCH during the NPRACH pause period, and adjusts a transmission behavior of transmitting the preamble during the NPRACH transmission period.

30 Claims, 9 Drawing Sheets

(51) Int. Cl.
 *H04L 5/00* (2006.01)
 *H04W 74/00* (2009.01)
(52) U.S. Cl.
 CPC ...... *H04W 72/042* (2013.01); *H04W 72/0446* (2013.01); *H04W 74/006* (2013.01); *Y02D 70/00* (2018.01)
(58) Field of Classification Search
 CPC ... H04W 74/006; Y02D 70/00; H04L 5/0048; H04L 5/0053
 See application file for complete search history.

(56) References Cited

U.S. PATENT DOCUMENTS

| | | | |
|---|---|---|---|
| 2015/0117374 A1* | 4/2015 | Wu | H04W 74/0833 370/329 |
| 2016/0174257 A1* | 6/2016 | Webb | H04W 74/006 455/450 |
| 2016/0255591 A1* | 9/2016 | Park | H04W 4/70 455/522 |
| 2016/0381712 A1* | 12/2016 | Yang | H04W 74/08 370/329 |
| 2017/0094688 A1* | 3/2017 | Lee | H04W 74/0833 |
| 2017/0290064 A1* | 10/2017 | Liu | H04W 74/006 |
| 2018/0160448 A1* | 6/2018 | Blankenship | H04W 74/004 |

* cited by examiner

Enabling the base station to broadcast a random access resource configuration, wherein the random access resource configuration comprises an NPRACH transmission period and an NPRACH access intermitting setting, and the NPRACH access intermitting setting allocates an NPRACH puase period and an NPDCCH
401

Enabling the user equipment to receive the random access resource configuration
402

Enabling the user equipment to transmit a preamble repeatedly in an NPRACH during the NPRACH transmission period according to the random access resource configuration
403

Enabling the base station to detect transmission of part of the preamble in the NPRACH during the NPRACH transmission period according to the preamble
404

Enabling the base station to transmit a random access feedback message in the NPDCCH during the NPRACH puase period according to detection of the transmission of the part of the preamble
405

Enabling the user equipment to receive the random access feedback message in the NPDCCH during the NPRACH puase period
406

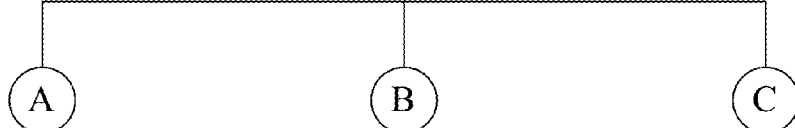

FIG. 4A

NARROWBAND INTERNET OF THINGS SYSTEM AND PREAMBLE TRANSMISSION METHOD THEREOF

PRIORITY

This application claims priority to U.S. Provisional Patent Application No. 62/351,310 filed on Jun. 17, 2016, which is hereby incorporated by reference in its entirety.

FIELD

The present invention relates to a Narrowband Internet of Things (NB-IoT) system and a preamble transmission method thereof; and more particularly, the present invention relates to an NB-IoT system that intermittently transmits a preamble and a preamble transmission method thereof.

BACKGROUND

The Internet of Things (IoT) communication is a kind of network technology that is being actively developed at present. With this technology, different devices can be connected in a network to communicate with and exchange data with each other. Most of the IoT communication technologies utilize an unlicensed band, so the security and communication quality cannot be ensured. Accordingly, the Narrowband Internet of Things (NB-IoT) that adopts a licensed band is advantageous.

Also because of its wide communication range, low power consumption, low computation complexity and low hardware cost, NB-IoT has become the IoT technology that are the most actively developed at present. Unfortunately, the existing NB-IoT technology still has the problem of unnecessary power consumption.

Specifically, in the NB-IoT system, usually a user equipment transmits a random access preamble repeatedly in a designated Narrowband Physical Random Access Channel (NPRACH) during a preset NPRACH transmission period.

However, if the base station that detects the random access preamble during the NPRACH transmission period is to transmit a random access response to the user equipment, the random access response cannot be received by the user equipment until the end of the NPRACH transmission period.

As a consequence, the user equipment unnecessarily transmits the random access preamble repeatedly during the time interval from the time when the random access preamble is detected by the base station to the end of the NPRACH transmission period to cause unnecessary power consumption. Accordingly, efforts have to be made in the art to overcome this problem.

SUMMARY

The disclosure includes a preamble transmission method for a Narrowband Internet of Things (NB-IoT) system. The NB-IoT system comprises a base station and a user equipment. The preamble transmission method comprises: (a) enabling the base station to broadcast a random access resource configuration, wherein the random access resource configuration comprises a Narrowband Physical Random Access Channel (NPRACH) transmission period and an NPRACH access intermitting setting, the NPRACH access intermitting setting allocates an NPRACH pause period and a Narrowband Physical Downlink Control Channel (NPDCCH); (b) enabling the user equipment to receive the random access resource configuration.

Further speaking, the preamble transmission method in one example further comprises: (c) enabling the user equipment to transmit a preamble repeatedly in an NPRACH during the NPRACH transmission period according to the random access resource configuration; (d) enabling the base station to detect the preamble in the NPRACH during the NPRACH transmission period; (e) enabling the base station to transmit a random access feedback message in the NPDCCH during the NPRACH pause period according to the preamble; (f) enabling the user equipment to receive the random access feedback message in the NPDCCH during the NPRACH pause period; and (g) enabling the user equipment to adjust the transmission behavior of transmitting the preamble during the NPRACH transmission period according to the random access feedback message.

The disclosure includes a Narrowband Internet of Things (NB-IoT) system, which comprises a base station and a user equipment. The base station is configured to broadcast a random access resource configuration, wherein the random access resource configuration comprises a Narrowband Physical Random Access Channel (NPRACH) transmission period and an NPRACH access intermitting setting, and the NPRACH access intermitting setting allocates an NPRACH pause period and a Narrowband Physical Downlink Control Channel (NPDCCH). The user equipment is configured to receive the random access resource configuration, and transmit a preamble repeatedly in an NPRACH during the NPRACH transmission period according to the random access resource configuration.

According to an example, the base station is further configured to detect the preamble in the NPRACH during the NPRACH transmission period, and to transmit a random access feedback message in the NPDCCH during the NPRACH pause period according to the preamble. The user equipment is further configured to receive the random access feedback message in the NPDCCH during the NPRACH pause period, and to adjust the transmission behavior of transmitting the preamble during the NPRACH transmission period according to the random access feedback message.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIGS. 4A-4B are flowchart diagrams of a preamble transmission method according to a fourth embodiment of the present invention.

DETAILED DESCRIPTION

In the following description, the present invention will be explained with reference to certain example embodiments thereof. However, these example embodiments are not intended to limit the present invention to any specific environment, example, embodiment, applications or particular implementations described in these example embodiments. Therefore, description of these example embodiments is only for purpose of illustration rather than to limit the present invention.

It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1A:
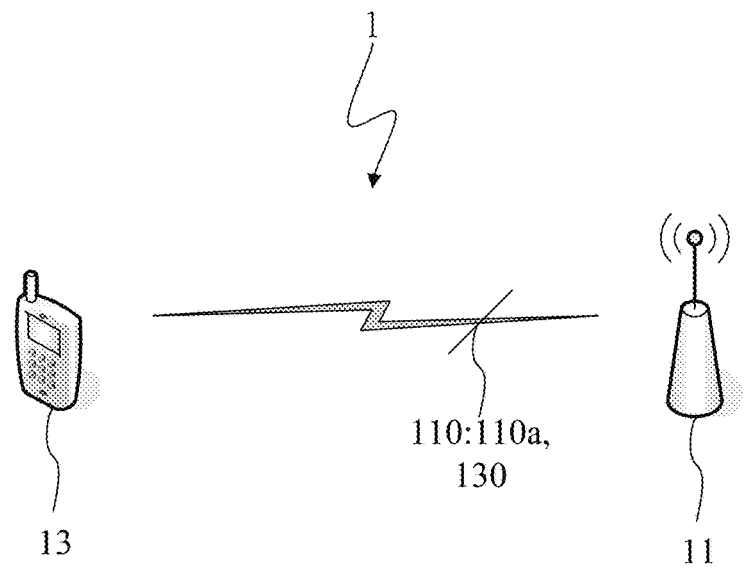
FIG. 1A is a schematic view of an NB-IoT system according to a first embodiment of the present invention.
Figures 1B, 1C:
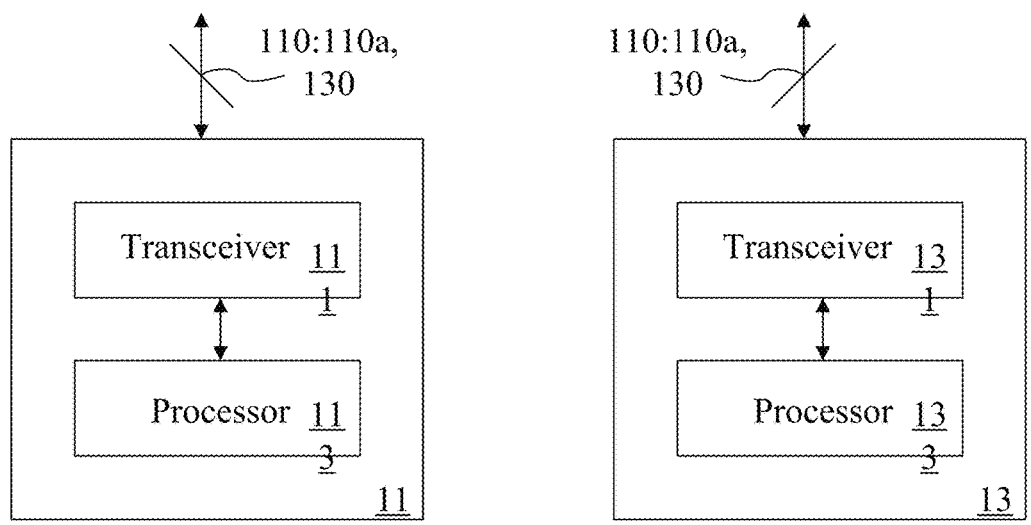
FIG. 1B is a block diagram of a base station according to the first embodiment of the present invention.
FIG. 1C is a block diagram of a user equipment according to the first embodiment of the present invention.

Please refer to FIG. 1A to FIG. 1D. FIG. 1A is a schematic view of an NB-IoT system 1 according to a first embodiment of the present invention. The NB-IoT system 1 comprises a base station 11 and a user equipment 13. FIG. 1B is a block diagram of the base station 11 according to the first embodiment of the present invention. The base station 11 comprises a transceiver 111 and a processor 113.

Figure 1D:
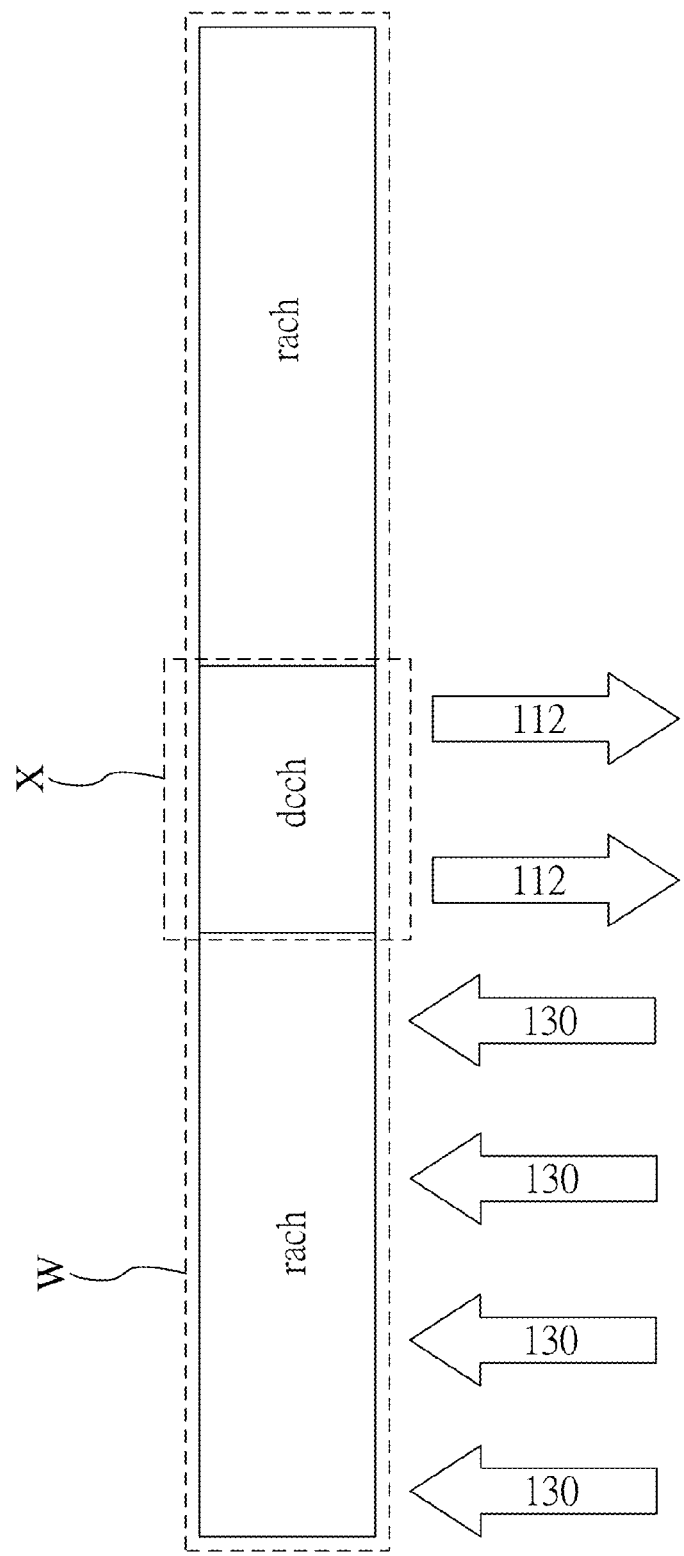
FIG. 1D is a schematic view illustrating uplink transmission of preambles of the NB-IoT system according to the first embodiment of the present invention.

FIG. 1C is a block diagram of the user equipment 13 according to the first embodiment of the present invention. The user equipment 13 comprises a transceiver 131 and a processor 133. FIG. 1D is a schematic view illustrating uplink transmission of preambles of the NB-IoT system 1 according to the first embodiment of the present invention. The individual elements are electrically connected with each other, and interactions therebetween will be further described hereinbelow.

First, a random access resource configuration 110 is broadcasted by the processor 113 of the base station 11 via the transceiver 111. The random access resource configuration 110 comprises an NPRACH transmission period W and an NPRACH access intermitting setting 110a in addition to information related to random access resources generally used in the NB-IoT.

Specifically, the NPRACH access intermitting setting 110a allocates an NPRACH pause period X and a Narrowband Physical Downlink Control Channel (NPDCCH) dcch to notify the user equipment 13 that a response from the base station 11 can be subsequently received in the NPDCCH dcch during the NPRACH pause period X.

The processor 133 of the user equipment 13 that has received the random access resource configuration 110 via the transceiver 131 transmits a preamble 130 repeatedly in an NPRACH rach during the NPRACH transmission period W according to the random access resource configuration 110.

Then the processor 113 of the base station 11 detects the preamble signal 130 in the NPRACH rach during the NPRACH transmission period W via the transceiver 111. If the base station 11 fails to detect the preamble 130 and, therefore, makes no response, the user equipment 13 will transmit the preamble repeatedly in the NPRACH rach during the NPRACH transmission period W.

In the first embodiment, the preamble 130 is detected by the base station 11 and, as a result, a random access feedback message 112 is transmitted by the processor 113 of the base station 11 in the NPDCCH dcch during the NPRACH pause period X via the transceiver 111 and according to the preamble 130 to notify the user equipment 13 that the preamble 130 has been obtained by the base station 11.

Accordingly, the processor 133 of the user equipment 13 that has received the random access feedback message 112 in the NPDCCH dcch during the NPRACH pause period X via the transceiver 131 adjusts the transmission behavior of transmitting the preamble 130 during the NPRACH transmission period W according to the random access feedback message 112 so as to avoid unnecessary power consumption caused by unnecessarily transmitting the preamble 130 repeatedly.

Figure 1E:
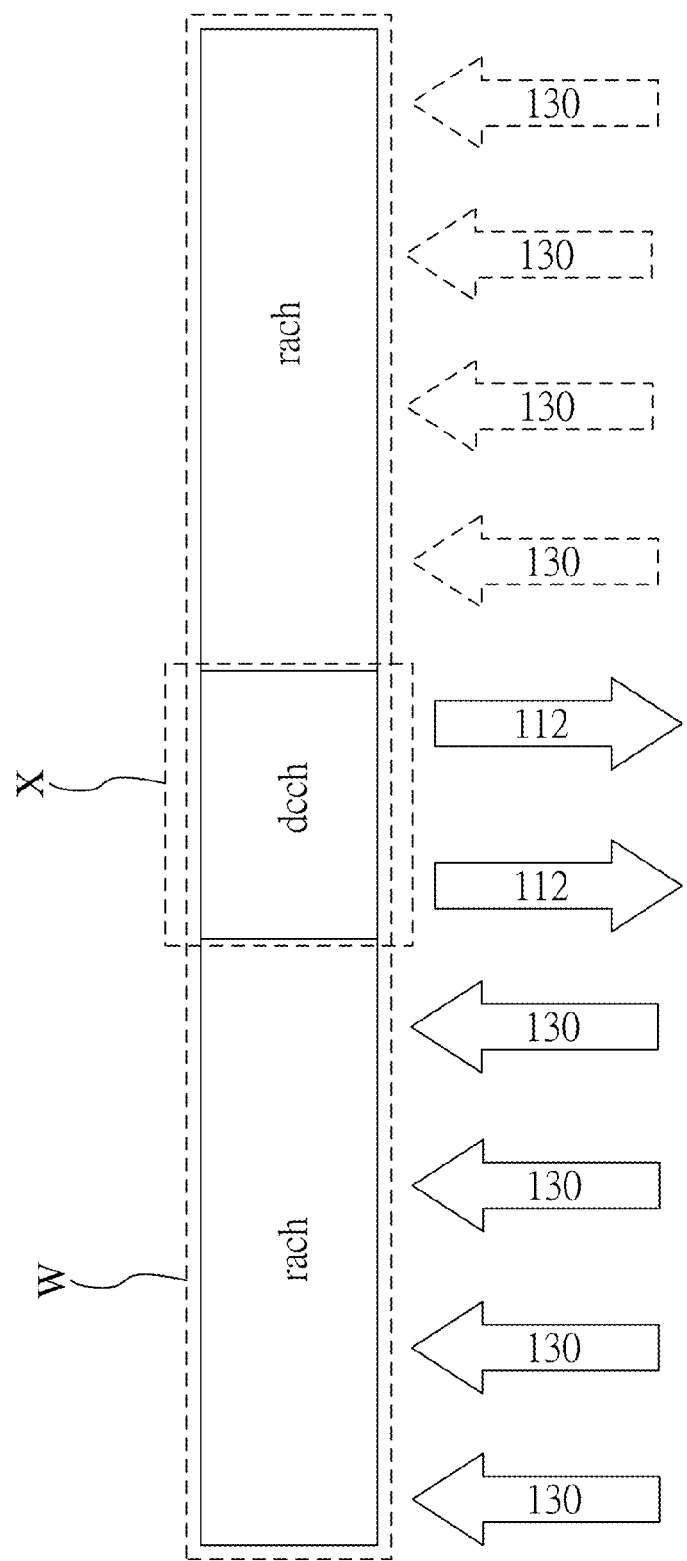
FIG. 1E is a schematic view illustrating adjustment of the preamble transmission behavior of the NB-IoT system according to the first embodiment of the present invention.

Please refer to FIG. 1E together for an example. FIG. 1E is a schematic view illustrating adjustment of the preamble transmission behavior of the NB-IoT system 1 according to the first embodiment of the present invention. In detail, in this example, the random access feedback message 112 is a random access response. After the random access feedback message 112 is received by the user equipment 13 in the NPDCCH dcch during the NPRACH pause period X, the user equipment 13 may stop transmitting the preamble 130 during a time interval from the end of the NPRACH pause period X to the end of the NPRACH transmission period W according to the random access feedback message 112 (preambles 130 that need not to be transmitted are indicated by dashed arrows). In this way, the purpose of power saving can be achieved.

It shall be particularly appreciated that, the main technical features of the present invention lie in that: by means of the NPRACH pause period X and the NPDCCH dcch, the preamble transmission behavior is changed in advance during the NPRACH transmission period to achieve the purpose of power saving. Accordingly, the preamble transmission behavior can be manipulated by those skilled in the art upon reviewing the disclosure of the present invention to achieve the purpose of power saving. Therefore, the aforesaid exemplary example is not intended to limit the present invention.

Figure 2A:
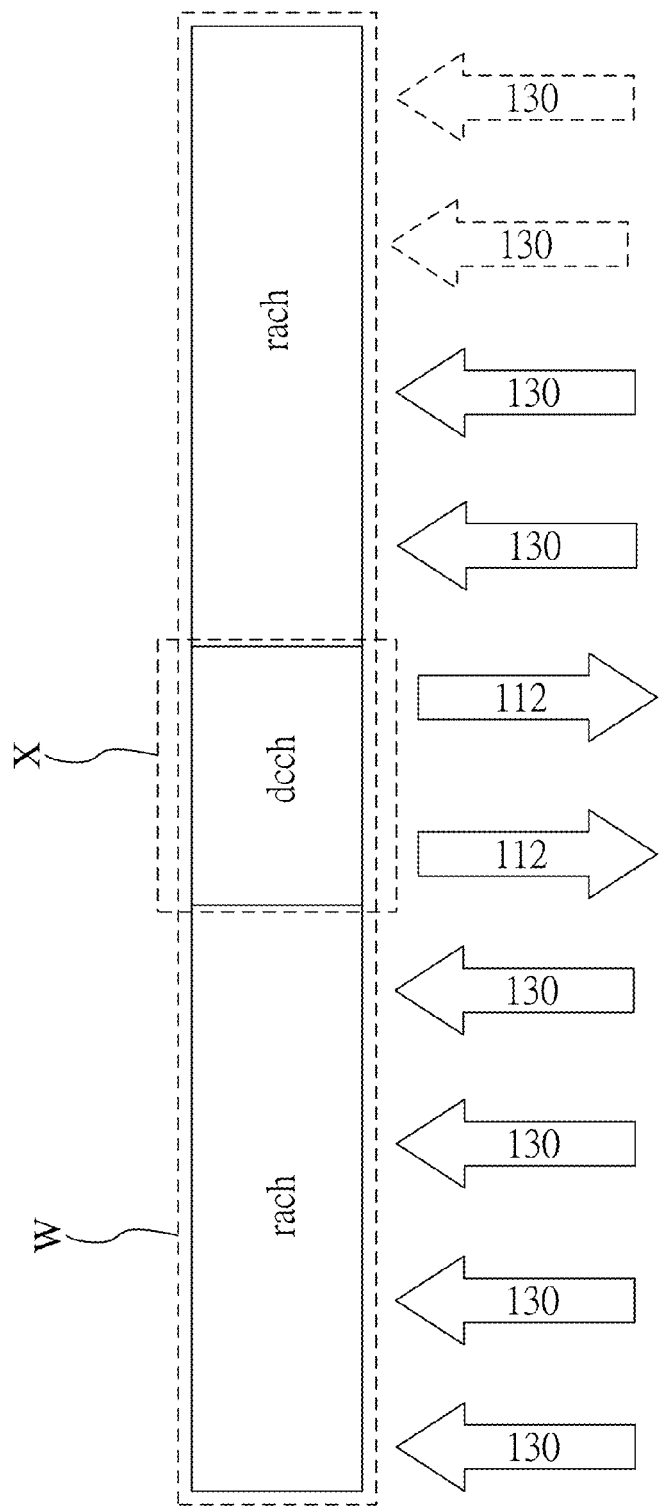
FIGS. 2A-2C are schematic views illustrating uplink transmission of preambles of an NB-IoT system according to a second embodiment of the present invention.
Figure 2B:
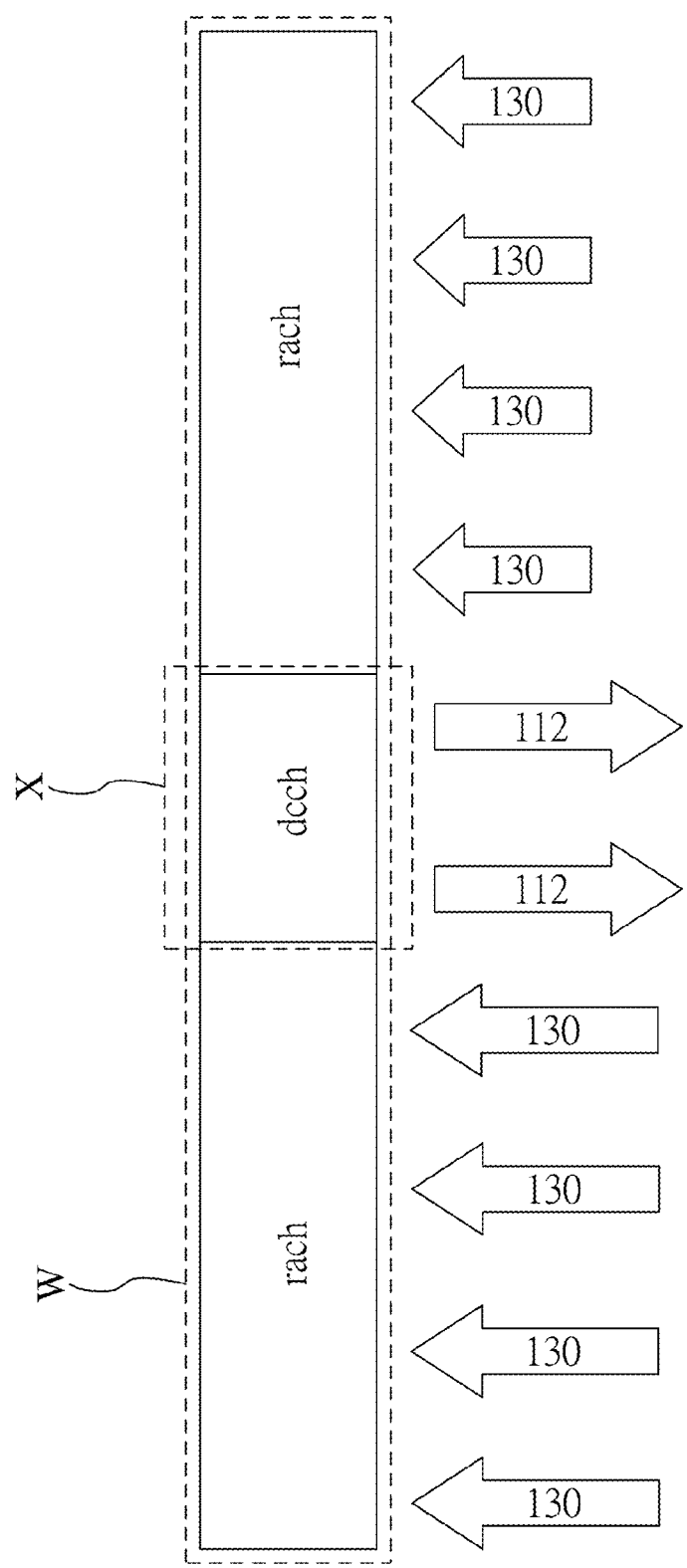
Figure 2C:
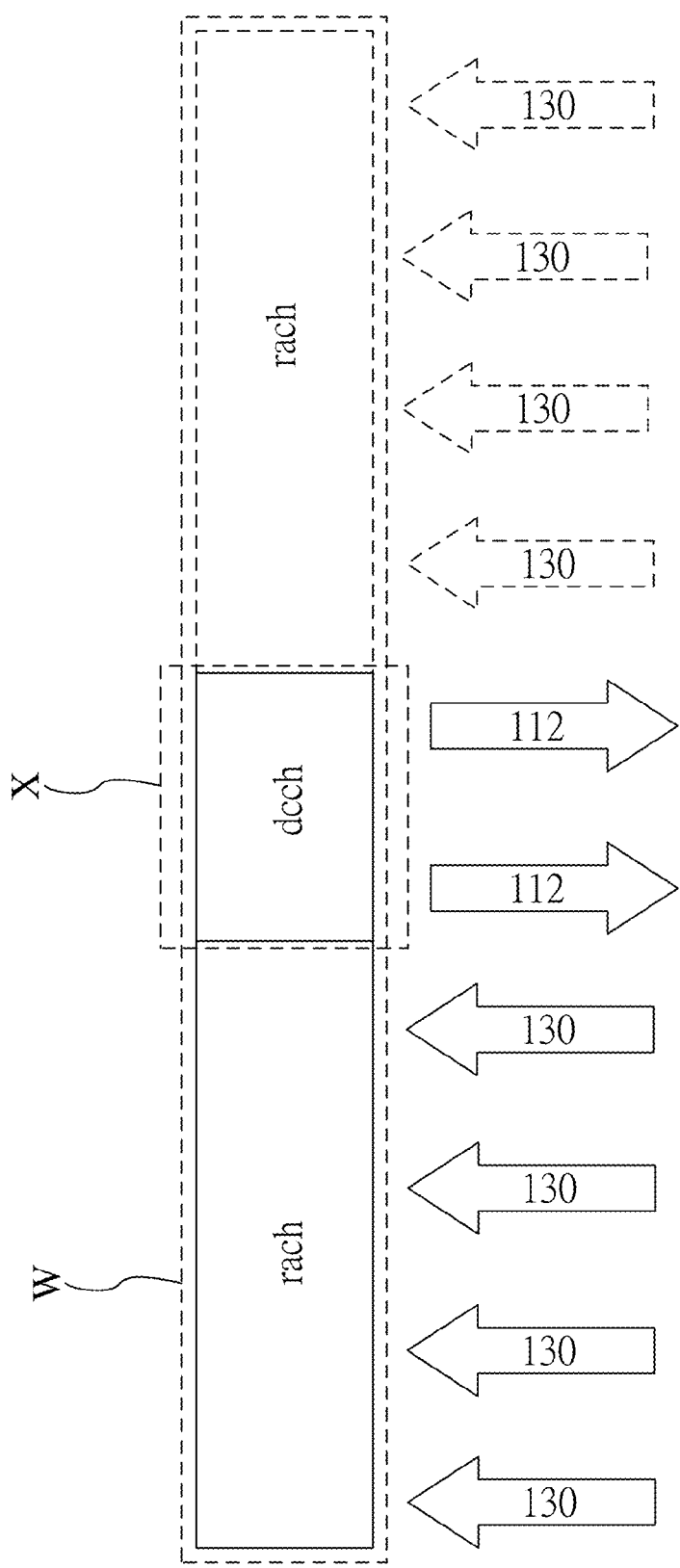

Please refer to FIG. 2A to FIG. 2C, which are schematic views illustrating uplink transmission of preambles of an NB-IoT system 1 according to a second embodiment of the present invention. The second embodiment is similar to the first embodiment in terms of the network framework, so elements indicated by the same symbols also have the same functions and will not be described again herein. The second embodiment is mainly intended to describe details of preamble detection by the base station of the present invention and how the user equipment utilizes the random access feedback message to adjust the preamble transmission behavior.

Similarly, first the processor 113 of the base station 11 broadcasts the random access resource configuration 110 via the transceiver 111. The random access resource configuration 110 further comprises an NPRACH transmission period W and an NPRACH access intermitting setting 110a. The NPRACH access intermitting setting 110a allocates the NPRACH pause period X and the NPDCCH dcch to notify the user equipment 13 that a response from the base station 11 can be subsequently received in the NPDCCH dcch during the NPRACH pause period X.

First, the user equipment 13 that has received the random access resource configuration 110 transmits the preamble 130 repeatedly in the NPRACH rach during the NPRACH transmission period W according to the random access resource configuration 110. Then the base station 11 detects the preamble 130 in the NPRACH rach during the NPRACH transmission period W. In the second embodiment, only transmission of part of the preamble 130 is detected by the processor 113 of the base station 11 via the transceiver 111.

Specifically, by "only transmission of part of the preamble 130 is detected", it means that an abnormality (e.g., the signal strength is weak, the signal is incomplete, and etc.) occurs in the detection of the preamble 130. This can be determined by the processor 113 of the base station 11 through comparing correlation of preamble of the received preamble 130 against a threshold.

Further speaking, if it is determined by the base station 11 that the correlation of preamble of the preamble 130 is greater than a specific threshold A, then the preamble 130 can be determined to have been completely received. On the other hand, if it is determined by the base station 11 that the correlation of preamble of the preamble 130 is smaller than the specific threshold A but greater than a specific threshold B, then the preamble 130 can be determined to have been partly received.

It shall be particularly appreciated that, the technology of comparing the correlation of preamble against a threshold to determine whether the preamble has been completely received can be readily understood by those skilled in the art, so it will not be further described herein. The main technical feature of the present invention is how to adjust the subsequent transmission according to the conditions of the received preamble.

Because, in the second embodiment, part of the preamble 130 is received by the base station 11, the processor 113 of the base station 11 transmits a random access feedback message 112 in the NPDCCH dcch during the NPRACH pause period X via the transceiver 111 and according to the transmission of the part of the preamble 130 to notify the user equipment 13 that the transmission of part of the preamble 130 is detected by the base station 11.

Please refer to FIG. 2A for an example. When the base station 11 determines that the preamble 130 can be completely received, the base station 11 may set the random access feedback message 112 as random access common control information (RACCI). The RACCI allocates a number-of-times-of-transmission parameter to notify the user equipment 13 to re-transmit the preamble 130 for a specific number of times.

Then the processor 133 of the user equipment 13 having received the random access feedback message 112 in the NPDCCH dcch during the NPRACH pause period X via the transceiver 131 transmits the preamble 130 in the NRPACH rach during a time interval from the end of the NPRACH pause period X to the end of the NPRACH transmission period W according to the specific number of times of transmission. Once the preamble 130 has been transmitted for the specific number of times, transmission of the preamble 130 during the NPRACH transmission period W is stopped (preambles 130 that need not to be transmitted are also indicated by dashed arrows).

For example, if the number of times of transmission is 2, then the user equipment 13 having received the random access feedback message 112 in the NPDCCH dcch re-transmits the preamble 130 in the NPRACH rach twice during the time interval from the end of the NPRACH pause period X to the end of the NPRACH transmission period W, and then stops transmitting the preamble 130.

Please refer to FIG. 2B for another example. Similarly, when the base station 11 determines that the preamble 130 can be completely received, the base station 11 may set the random access feedback message 112 as RACCI. The RACCI allocates a power adjustment parameter to notify the user equipment 13 to adjust the transmission power of the preamble 130.

Accordingly, the processor 133 of the user equipment 13 having received the random access feedback message 112 in the NPDCCH dcch during the NPRACH pause period X adjusts the transmission power according to the power adjustment parameter and, during the time interval from the end of the NPRACH pause period X to the end of the NPRACH transmission period W, transmits the preamble 130 according to the adjusted power. In this way, the purpose of power saving can be achieved.

For example, after receiving the random access feedback message 112 in the NPDCCH dcch, the user equipment 113 may decrease the transmission power and, during the time interval from the end of the NPRACH pause period X to the end of the NPRACH transmission period W, transmit the preamble 130 in the NPRACH rach at a decreased transmission power.

Please refer to FIG. 2C for yet another example. When the base station 11 determines that the preamble 130 can be completely received, the random access feedback message 112 is RACCI. RACCI allocates a resource adjustment instruction to instruct the user equipment 13 to release the NPRACH rach for another user equipment (not shown) in another coverage enhancement level to use.

Then the processor 133 of the user equipment 13 having received the random access feedback message 112 in the NPDCCH dcch during the NPRACH pause period X stops transmitting the preamble 130 during the time interval from the end of the NPRACH pause period X to the end of the NPRACH transmission period W and releases the NPRACH for the another user equipment in the another coverage enhancement level to use according to the resource adjustment instruction.

It shall be particularly appreciated that, the aforesaid coverage enhancement level refers to a hierarchy that is set for user equipments having different communication conditions, and a user equipment having poor signal receiving conditions with the base station may be classified into a higher coverage enhancement level so that more network resources are used as an attempt to obtain better communication conditions with the base station.

In the aforesaid example, because the user equipment 13 has completed the random access preamble transmission to the base station in the original coverage enhancement level, the NRPACH originally occupied by and no longer needed by the user equipment 13 can be released to another coverage enhancement level for use by a user equipment in the another coverage enhancement level.

Figure 3:
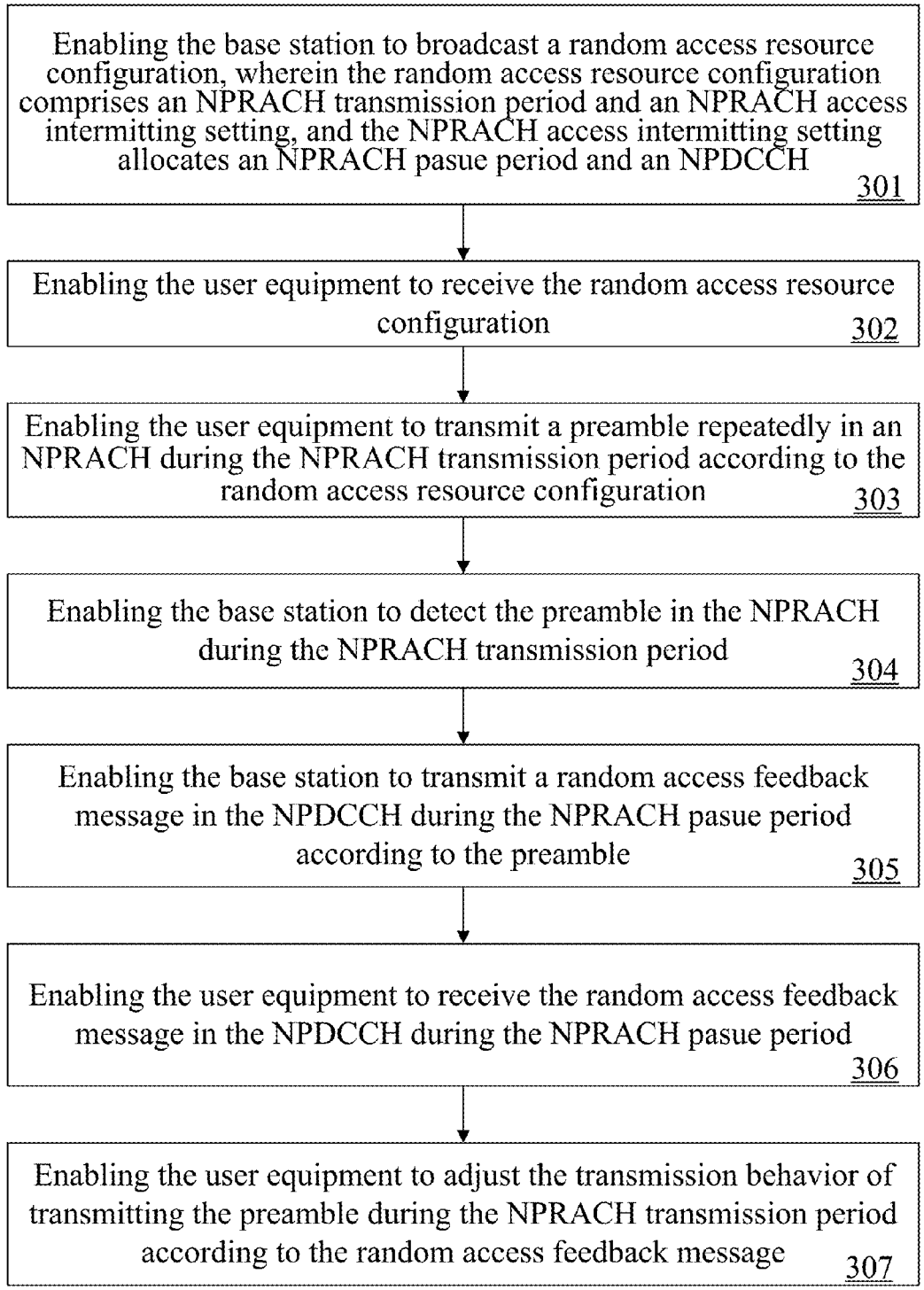
FIG. 3 is a flowchart diagram of a preamble transmission method according to a third embodiment of the present invention.

A third embodiment of the present invention is a preamble transmission method, a flowchart diagram of which is shown in FIG. 3. The method of the third embodiment is for use in an NB-IoT system (e.g., the NB-IoT system 1 of the aforesaid embodiment). The NB-IoT system comprises a base station and a user equipment. Steps of the preamble transmission method of the third embodiment are detailed as follows.

First, step 301 is executed to enable the base station to broadcast a random access resource configuration. The random access resource configuration comprises an NPRACH transmission period and an NPRACH access intermitting setting, and the NPRACH access intermitting setting allocates an NPRACH pause period and an NPDCCH. Then, step 302 is executed to enable the user equipment to receive the random access resource configuration.

Next, step 303 is executed to enable the user equipment to transmit a preamble repeatedly in an NPRACH during the NPRACH transmission period according to the random access resource configuration. Step 304 is executed to enable the base station to detect the preamble in the NPRACH during the NPRACH transmission period. Step 305 is executed to enable the base station to transmit a random access feedback message in the NPDCCH during the NPRACH pause period according to the preamble.

Step 306 is executed to enable the user equipment to receive the random access feedback message in the NPDCCH during the NPRACH pause period. Finally, step 307 is executed to enable the user equipment to adjust the transmission behavior of transmitting the preamble during the NPRACH transmission period according to the random access feedback message.

Also as an example, when the random access feedback message is a random access response, the user equipment having received the random access feedback message in the NPDCCH during the NPRACH pause period may stop transmitting the preamble during the time interval from the end of the NPRACH pause period to the end of the NPRACH transmission period according to the random access feedback message.

Figure 4B:
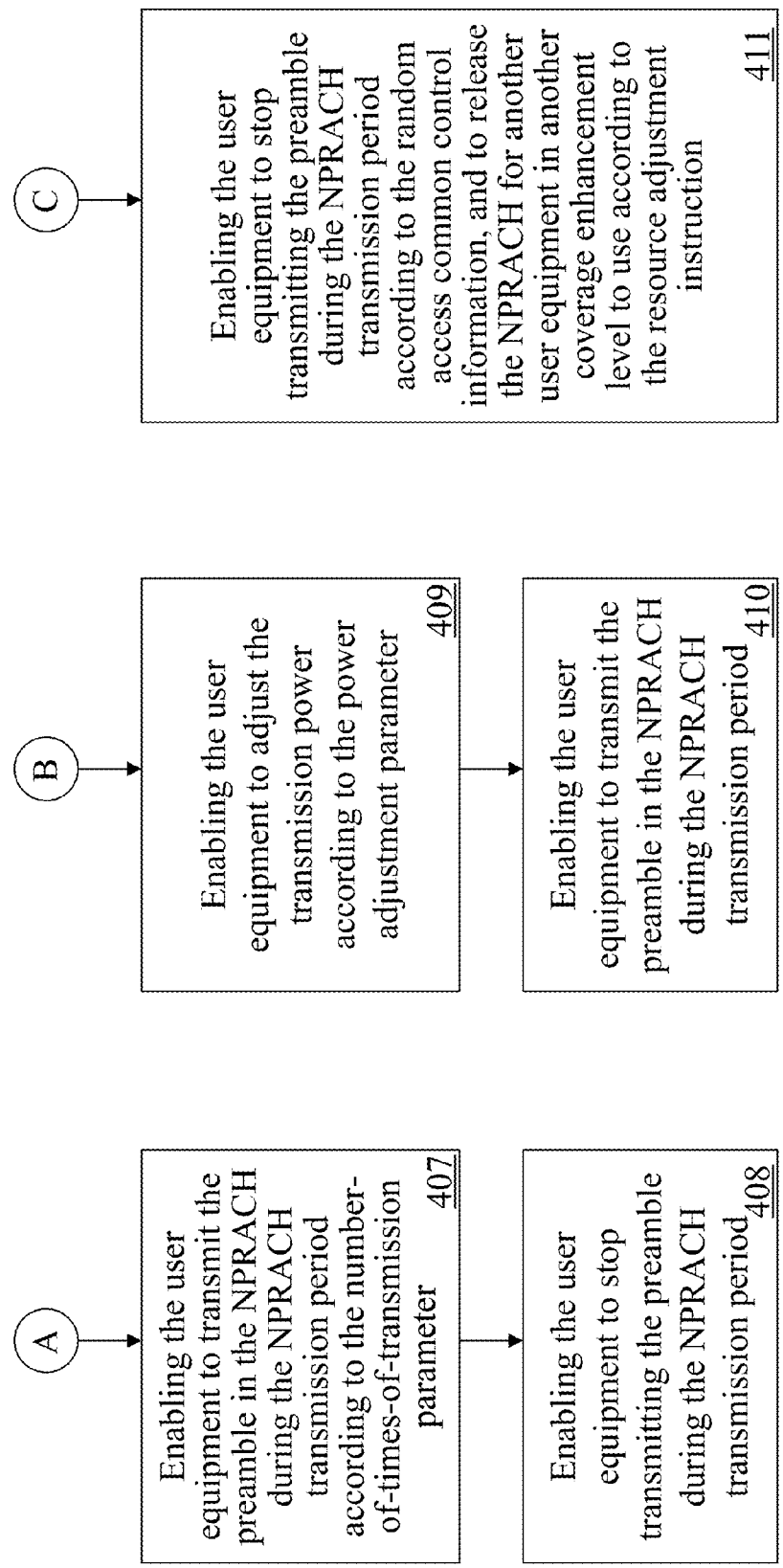

A fourth embodiment of the present invention is a preamble transmission method, a flowchart diagram of which is shown in FIG. 4A to FIG. 4B. The method of the fourth embodiment is for use in an NB-IoT system (e.g., the NB-IoT system 1 of the aforesaid embodiment). The NB-IoT system comprises a base station and a user equipment. Steps of the preamble transmission method of the fourth embodiment are detailed as follows.

First, step 401 is executed to enable the base station to broadcast a random access resource configuration. The random access resource configuration comprises an NPRACH transmission period and an NPRACH access intermitting setting, and the NPRACH access intermitting setting allocates an NPRACH pause period and an NPDCCH. Then, step 402 is executed to enable the user equipment to receive the random access resource configuration. Next, step 403 is executed to enable the user equipment to transmit a preamble repeatedly in an NPRACH during the NPRACH transmission period according to the random access resource configuration.

Next, step 404 is executed to enable the base station to detect transmission of part of the preamble in the NPRACH during the NPRACH transmission period. Step 405 is executed to enable the base station to transmit a random access feedback message in the NPDCCH during the NPRACH pause period according to detection of the transmission of the part of the preamble. Step 406 is executed to enable the user equipment to receive the random access feedback message in the NPDCCH during the NPRACH pause period.

This feedback message is an RACCI. When a number-of-times-of-transmission parameter is allocated by the RACCI, step 407 is executed to enable the user equipment to transmit the preamble in the NPRACH during the NPRACH transmission period according to the number-of-times-of-transmission parameter. Finally, step 408 is executed to enable the user equipment to stop transmitting the preamble during the NPRACH transmission period after the step 407.

On the other hand, when a power adjustment parameter is allocated by the RACCI, step 409 is executed to enable the user equipment to adjust the transmission power according to the power adjustment parameter. Then step 410 is executed to enable the user equipment to transmit the preamble in the NPRACH during the NPRACH transmission period after the step 409.

Also, when a resource adjustment instruction is allocated by the RACCI, step 411 is executed to enable the user equipment to stop transmitting the preamble during the NPRACH transmission period according to the RACCI, and to release the NPRACH for another user equipment in another coverage enhancement level to use according to the resource adjustment instruction.

According to the above descriptions, the NB-IoT system and the preamble transmission method thereof according to the present invention mainly utilize an additionally provided pause period in a single NPRACH transmission period to determine, in advance, whether the random access procedure has been completed. Thereby, unnecessary transmissions of the preamble can be avoided to achieve the purpose of power saving.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A preamble transmission method for a Narrowband Internet of Things (NB-IoT) system, the NB-IoT system comprising a base station and a user equipment, the preamble transmission method comprising:
   (a) the base station broadcasting a random access resource configuration, wherein the random access resource configuration comprises a Narrowband Physical Random Access Channel (NPRACH) transmission period and an NPRACH access intermitting setting, the NPRACH access intermitting setting allocates an NPRACH pause period and a Narrowband Physical Downlink Control Channel (NPDCCH);
   (b) the user equipment receiving the random access resource configuration;
   (c) the user equipment transmitting a preamble repeatedly in an NPRACH during the NPRACH transmission period according to the random access resource configuration;
   (d) the base station detecting the preamble in the NPRACH during the NPRACH transmission period;
   (e) the base station transmitting a random access feedback message in the NPDCCH during the NPRACH pause period according to the preamble;
   (f) the user equipment receiving the random access feedback message in the NPDCCH during the NPRACH pause period; and
   (g) the user equipment adjusting transmission behavior of transmitting the preamble during the NPRACH transmission period according to the random access feedback message.

2. The preamble transmission method according to claim 1, wherein the random access feedback message is a random access response, and the step (g) further comprises:
   (g1) the user equipment stopping transmitting the preamble during the NPRACH transmission period according to the random access response.

3. The preamble transmission method according to claim 1, wherein the step (d) further comprises:

(d1) the base station detecting transmission of part of the preamble in the NPRACH during the NPRACH transmission period;

wherein the step (e) further comprises:

(e1) the base station transmitting the random access feedback message in the NPDCCH during the NPRACH pause period according to detection of the transmission of the part of the preamble, wherein the random access feedback message is random access common control information, and the random access common control information allocates a number-of-times-of-transmission parameter;

wherein the step (g) further comprises:

(g1) the user equipment transmitting the preamble in the NPRACH during the NPRACH transmission period according to the number-of-times-of-transmission parameter; and (g2) the user equipment stopping transmitting the preamble during the NPRACH transmission period after the step (g1).

4. The preamble transmission method according to claim 1, wherein the step (d) further comprises:

(d1) the base station detecting transmission of part of the preamble in the NPRACH during the NPRACH transmission period;

wherein the step (e) further comprises:

(e1) the base station transmitting the random access feedback message in the NPDCCH during the NPRACH pause period according to detection of the transmission of the part of the preamble, wherein the random access feedback message is random access common control information, and the random access common control information allocates a power adjustment parameter;

wherein the step (g) further comprises:

(g1) the user equipment adjusting a transmission power according to the power adjustment parameter; and (g2) the user equipment transmitting the preamble in the NPRACH during the NPRACH transmission period after the step (g1).

5. The preamble transmission method according to claim 1, wherein the step (d) further comprises:

(d1) the base station detecting transmission of part of the preamble in the NPRACH during the NPRACH transmission period;

wherein the step (e) further comprises:

(e1) the base station transmitting the random access feedback message in the NPDCCH during the NPRACH pause period according to detection of the transmission of the part of the preamble, wherein the random access feedback message is random access common control information, and the random access common control information allocates a resource adjustment instruction that is used to instruct the user equipment to release the NPRACH for another user equipment in another coverage enhancement level to use;

wherein the step (g) further comprises:

(g1) the user equipment stopping transmitting the preamble during the NPRACH transmission period according to the random access common control information, and to release the NPRACH for the another user equipment in the another coverage enhancement level to use according to the resource adjustment instruction.

6. A Narrowband Internet of Things (NB-IoT) system, comprising:

a base station, being configured to broadcast a random access resource configuration, wherein the random access resource configuration comprises a Narrowband Physical Random Access Channel (NPRACH) transmission period and an NPRACH access intermitting setting, the NPRACH access intermitting setting allocates an NPRACH pause period and a Narrowband Physical Downlink Control Channel (NPDCCH); and a user equipment, being configured to receive the random access resource configuration, and transmit a preamble repeatedly in an NPRACH during the NPRACH transmission period according to the random access resource configuration;

wherein the base station is further configured to:
detect the preamble in the NPRACH during the NPRACH transmission period; and
transmit a random access feedback message in the NPDCCH during the NPRACH pause period according to the preamble;

and wherein the user equipment is further configured to:
receive the random access feedback message in the NPDCCH during the NPRACH pause period; and
adjust transmission behavior of transmitting the preamble during the NPRACH transmission period according to the random access feedback message.

7. The NB-IoT system according to claim 6, wherein the random access feedback message is a random access response, and the user equipment is further configured to stop transmitting the preamble during the NPRACH transmission period according to the random access response.

8. The NB-IoT system according to claim 6, wherein the base station is further configured to:
detect transmission of part of the preamble in the NPRACH during the NPRACH transmission period;
transmit the random access feedback message in the NPDCCH during the NPRACH pause period according to detection of the transmission of the part of the preamble, wherein the random access feedback message is random access common control information, and the random access common control information allocates a number-of-times-of-transmission parameter;

wherein the user equipment is further configured to:
transmit the preamble in the NPRACH during the NPRACH transmission period according to the number-of-times-of-transmission parameter; and
stop transmitting the preamble during the NPRACH transmission period.

9. The NB-IoT system according to claim 6, wherein the base station is further configured to:
detect transmission of part of the preamble in the NPRACH during the NPRACH transmission period; and
transmit the random access feedback message in the NPDCCH during the NPRACH pause period according to detection of the transmission of the part of the preamble, wherein the random access feedback message is random access common control information, and the random access common control information allocates a power adjustment parameter;

wherein the user equipment is further configured to:
adjust a transmission power according to the power adjustment parameter; and
transmit the preamble in the NPRACH during the NPRACH transmission period.

10. The NB-IoT system according to claim 6, wherein the base station is further configured to:

detect transmission of part of the preamble in the NPRACH during the NPRACH transmission period; and transmit the random access feedback message in the NPDCCH during the NPRACH pause period according to detection of the transmission of the part of the preamble, wherein the random access feedback message is random access common control information, and the random access common control information allocates a resource adjustment instruction that is used to instruct the user equipment to release the NPRACH for another user equipment in another coverage enhancement level;

wherein the user equipment is further configured to:

stop transmitting the preamble during the NPRACH transmission period according to the random access common control information, and release the NPRACH for the another use equipment in the another coverage enhancement level to use according to the resource adjustment instruction.

11. A preamble transmission method for a base station, the base station being used in a Narrowband Internet of Things (NB-IoT) system that further comprises a user equipment, the preamble transmission method comprising:

(a) the base station broadcasting a random access resource configuration, wherein the random access resource configuration comprises a Narrowband Physical Random Access Channel (NPRACH) transmission period and an NPRACH access intermitting setting, the NPRACH access intermitting setting allocates an NPRACH pause period and a Narrowband Physical Downlink Control Channel (NPDCCH) so that the user equipment receives the random access resource configuration and transmits a preamble repeatedly in an NPRACH during the NPRACH transmission period according to the random access resource configuration;

(b) the base station detecting the preamble in the NPRACH during the NPRACH transmission period; and (c) the base station transmitting a random access feedback message in the NPDCCH during the NPRACH pause period according to the preamble so that the user equipment receives the random access feedback message in the NPDCCH during the NPRACH pause period and adjusts transmission behavior of transmitting the preamble during the NPRACH transmission period according to the random access feedback message.

12. The preamble transmission method according to claim 11, wherein the random access feedback message is a random access response, and the user equipment stops transmitting the preamble during the NPRACH transmission period according to the random access response.

13. The preamble transmission method according to claim 11, wherein the step (b) further comprises:

(b1) the base station detecting transmission of part of the preamble in the NPRACH during the NPRACH transmission period;

wherein the step (c) further comprises:

(c1) the base station transmitting the random access feedback message in the NPDCCH during the NPRACH pause period according to detection of the transmission of the part of the preamble, wherein the random access feedback message is random access common control information, and the random access common control information allocates a number-of-times-of-transmission parameter so that the user equipment transmits the preamble in the NPRACH according to the number-of-times-of-transmission parameter and then stops transmitting the preamble during the NPRACH transmission period.

14. The preamble transmission method according to claim 11, wherein the step (b) further comprises:

(b1) the base station detecting transmission of part of the preamble in the NPRACH during the NPRACH transmission period;

wherein the step (c) further comprises:

(C1) the base station transmitting the random access feedback message in the NPDCCH during the NPRACH pause period according to detection of the transmission of the part of the preamble, wherein the random access feedback message is random access common control information, and the random access common control information allocates a power adjustment parameter so that the user equipment adjusts a transmission power according to the power adjustment parameter and then transmits the preamble in the NPRACH during the NPRACH transmission period.

15. The preamble transmission method according to claim 11, wherein the step (b) further comprises:

(b1) the base station detecting transmission of part of the preamble in the NPRACH during the NPRACH transmission period;

wherein the step (c) further comprises:

(c1) the base station transmitting the random access feedback message in the NPDCCH during the NPRACH pause period according to detection of the transmission of the part of the preamble, wherein the random access feedback message is random access common control information, and the random access common control information allocates a resource adjustment instruction that is used to instruct the user equipment to release the NPRACH for another user equipment in another coverage enhancement level to use so that the user equipment stops transmitting the preamble during the NPRACH transmission period according to the random access common control information and release the NPRACH for the another user equipment in the another coverage enhancement level to use according to the resource adjustment instruction.

16. A base station for use in a Narrowband Internet of Things (NB-IoT) system, the NB-IoT system further comprising a user equipment, the base station comprising:

a transceiver; and a processor;

wherein the processor is configured to perform the following operations via the transceiver:

broadcasting a random access resource configuration, wherein the random access resource configuration comprises a Narrowband Physical Random Access Channel (NPRACH) transmission period and an NPRACH access intermitting setting, the NPRACH access intermitting setting allocates an NPRACH pause period and a Narrowband Physical Downlink Control Channel (NPDCCH) so that the user equipment receives the random access resource configuration and transmits a preamble repeatedly in an NPRACH during the NPRACH transmission period according to the random access resource configuration;

detecting the preamble in the NPRACH during the NPRACH transmission period; and transmitting a random access feedback message in the NPDCCH during the NPRACH pause period according to the preamble so that the user equipment receives the random access feedback message in the NPDCCH during the NPRACH pause period and adjusts transmission behavior of transmitting the preamble during the NPRACH transmission period according to the random access feedback message.

17. The base station according to claim 16, wherein the random access feedback message is a random access response, and the user equipment stops transmitting the preamble during the NPRACH transmission period according to the random access response.

18. The base station according to claim 16, wherein the processor is further configured to perform the following operations via the transceiver:
   detect transmission of part of the preamble in the NPRACH during the NPRACH transmission period; and
   transmit the random access feedback message in the NPDCCH during the NPRACH pause period according to detection of the transmission of the part of the preamble, wherein the random access feedback message is random access common control information, and the random access common control information allocates a number-of-times-of-transmission parameter so that the user equipment transmits the preamble in the NPRACH according to the number-of-times-of-transmission parameter and then stops transmitting the preamble during the NPRACH transmission period.

19. The base station according to claim 16, wherein the processor is further configured to perform the following operations via the transceiver:
   detecting transmission of part of the preamble in the NPRACH during the NPRACH transmission period; and
   transmitting the random access feedback message in the NPDCCH during the NPRACH pause period according to detection of the transmission of the part of the preamble, wherein the random access feedback message is random access common control information, and the random access common control information allocates a power adjustment parameter so that the user equipment adjusts a transmission power according to the power adjustment parameter and then transmits the preamble in the NPRACH during the NPRACH transmission period.

20. The base station according to claim 16, wherein the processor is further configured to perform the following operations via the transceiver:
   detecting transmission of part of the preamble in the NPRACH during the NPRACH transmission period;
   transmitting the random access feedback message in the NPDCCH during the NPRACH pause period according to detection of the transmission of the part of the preamble, wherein the random access feedback message is random access common control information, and the random access common control information allocates a resource adjustment instruction that is used to instruct the user equipment to release the NPRACH for another user equipment in another coverage enhancement level to use so that the user equipment stops transmitting the preamble during the NPRACH transmission period according to the random access common control information and release the NPRACH for the another user equipment in the another coverage enhancement level to use according to the resource adjustment instruction.

21. A preamble transmission method for a user equipment, the user equipment being used in a Narrowband Internet of Things (NB-IoT) system that further comprises a base station, the preamble transmission method comprising:
   (a) the user equipment receiving a random access resource configuration broadcasted by the base station, wherein the random access resource configuration comprises a Narrowband Physical Random Access Channel (NPRACH) transmission period and an NPRACH access intermitting setting, the NPRACH access intermitting setting allocates an NPRACH pause period and a Narrowband Physical Downlink Control Channel (NPDCCH);
   (b) the user equipment transmitting a preamble repeatedly in an NPRACH during the NPRACH transmission period according to the random access resource configuration so that the base station detects the preamble in the NPRACH during the NPRACH transmission period and transmits a random access feedback message in the NPDCCH during the NPRACH pause period according to the preamble;
   (c) the user equipment receiving the random access feedback message in the NPDCCH during the NPRACH pause period; and
   (d) the user equipment adjusting transmission behavior of transmitting the preamble during the NPRACH transmission period according to the random access feedback message.

22. The preamble transmission method according to claim 21, wherein the random access feedback message is a random access response, and the step (d) further comprises:
   (d1) the user equipment stopping transmitting the preamble during the NPRACH transmission period according to the random access response.

23. The preamble transmission method according to claim 21, wherein the base station detects transmission of part of the preamble in the NPRACH during the NPRACH transmission period and transmits the random access feedback message in the NPDCCH during the NPRACH pause period according to detection of the transmission of the part of the preamble, wherein the random access feedback message is random access common control information, and the random access common control information allocates a number-of-times-of-transmission parameter;
   wherein the step (d) further comprises:
   (d1) the user equipment transmitting the preamble in the NPRACH during the NPRACH transmission period according to the number-of-times-of-transmission parameter; and
   (d2) the user equipment stopping transmitting the preamble during the NPRACH transmission period after the step (d1).

24. The preamble transmission method according to claim 21, wherein the base station detects transmission of part of the preamble in the NPRACH during the NPRACH transmission period and transmits the random access feedback message in the NPDCCH during the NPRACH pause period according to detection of the transmission of the part of the preamble, wherein the random access feedback message is random access common control information, and the random access common control information allocates a power adjustment parameter;
   wherein the step (d) further comprises:
   (d1) the user equipment adjusting a transmission power according to the power adjustment parameter; and (d2) the user equipment transmitting the preamble in the NPRACH during the NPRACH transmission period after the step (d1).

25. The preamble transmission method according to claim 21, wherein the base station detects transmission of part of the preamble in the NPRACH during the NPRACH transmission period and transmits the random access feedback message in the NPDCCH during the NPRACH pause period according to detection of the transmission of the part of the preamble, wherein the random access feedback message is random access common control information, and the random access common control information allocates a resource adjustment instruction that is used to instruct the user equipment to release the NPRACH for another user equipment in another coverage enhancement level;

wherein the step (d) further comprises:
(d1) the user equipment stopping transmitting the preamble during the NPRACH transmission period according to the random access common control information, and to release the NPRACH for the another user equipment in the another coverage enhancement level to use according to the resource adjustment instruction.

26. A user equipment for use in a Narrowband Internet of Things (NB-IoT) system, the NB-IoT system further comprising a base station, the user equipment comprising:
a transceiver; and
a processor;
wherein the processor is configured to perform the following operations via the transceiver:
receiving a random access resource configuration broadcasted by the base station, wherein the random access resource configuration comprises a Narrowband Physical Random Access Channel (NPRACH) transmission period and an NPRACH access intermitting setting, the NPRACH access intermitting setting allocates an NPRACH pause period and a Narrowband Physical Downlink Control Channel (NPDCCH);
transmitting a preamble repeatedly in an NPRACH during the NPRACH transmission period according to the random access resource configuration so that the base station detects the preamble in the NPRACH during the NPRACH transmission period and transmits a random access feedback message in the NPDCCH during the NPRACH pause period according to the preamble;
receiving the random access feedback message in the NPDCCH during the NPRACH pause period; and
adjusting transmission behavior of transmitting the preamble during the NPRACH transmission period according to the random access feedback message.

27. The user equipment according to claim 26, wherein the random access feedback message is a random access response, and the processor is further configured to perform the following operation via the transceiver:
stop transmitting the preamble during the NPRACH transmission period according to the random access response.

28. The user equipment according to claim 26, wherein the base station detects transmission of part of the preamble in the NPRACH during the NPRACH transmission period and transmits the random access feedback message in the NPDCCH during the NPRACH pause period according to detection of the transmission of the part of the preamble, wherein the random access feedback message is random access common control information, and the random access common control information allocates a number-of-times-of-transmission parameter;
wherein the processor is further configured to perform the following operations via the transceiver:
transmitting the preamble in the NPRACH during the NPRACH transmission period according to the number-of-times-of-transmission parameter; and
stopping transmitting the preamble during the NPRACH transmission period.

29. The user equipment according to claim 26, wherein the base station detects transmission of part of the preamble in the NPRACH during the NPRACH transmission period and transmits the random access feedback message in the NPDCCH during the NPRACH pause period according to detection of the transmission of the part of the preamble, wherein the random access feedback message is random access common control information, and the random access common control information allocates a power adjustment parameter;
wherein the processor is further configured to perform the following operations via the transceiver:
adjusting a transmission power according to the power adjustment parameter; and
transmitting the preamble in the NPRACH during the NPRACH transmission period.

30. The user equipment according to claim 26, wherein the base station detects transmission of part of the preamble in the NPRACH during the NPRACH transmission period and transmits the random access feedback message in the NPDCCH during the NPRACH pause period according to detection of the transmission of the part of the preamble, wherein the random access feedback message is random access common control information, and the random access common control information allocates a resource adjustment instruction that is used to instruct the user equipment to release the NPRACH for another user equipment in another coverage enhancement level to use;
wherein the processor is further configured to perform the following operations via the transceiver:
stopping transmitting the preamble during the NPRACH transmission period according to the random access common control information, and to release the NPRACH for the another user equipment in the another coverage enhancement level to use according to the resource adjustment instruction.

* * * * *